US008628839B2

(12) United States Patent
Matsuda et al.

(10) Patent No.: US 8,628,839 B2
(45) **Date of Patent: *Jan. 14, 2014**

(54) RECORDING MEDIUM

(75) Inventors: Tsukasa Matsuda, Kanagawa (JP); Eizo Kurihara, Kanagawa (JP); Shoji Yamaguchi, Kanagawa (JP); Kunihiro Takahashi, Kanagawa (JP); Mario Fuse, Kanagawa (JP); Yasunori Koda, Kanagawa (JP); Ryuichi Kisaka, Tokyo (JP); Tomotsugu Takahashi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1527 days.

This patent is subject to a terminal disclaimer.

(21) Appl. No.: 11/583,901

(22) Filed: Oct. 20, 2006

(65) Prior Publication Data

US 2007/0146765 A1 Jun. 28, 2007

(30) Foreign Application Priority Data

Dec. 26, 2005 (JP) ................................ 2005-373618
Dec. 28, 2005 (JP) ................................ 2005-380059

(51) Int. Cl.
*B32B 3/00* (2006.01)
*B41M 5/00* (2006.01)

(52) U.S. Cl.
USPC .................... 428/201; 428/211.1; 428/692.1; 428/900; 428/916; 283/82; 162/138; 162/140

(58) Field of Classification Search
USPC ................. 162/138, 140; 283/82; 340/572.1, 340/572.6; 428/201, 211.1, 900, 916, 692.1
See application file for complete search history.

(56) References Cited

U.S. PATENT DOCUMENTS

| | | | | | |
|---|---|---|---|---|---|
| 4,081,584 | A * | 3/1978 | Akiyama et al. | 428/514 |
| 4,639,278 | A | 1/1987 | Makino et al. | |
| 4,660,025 | A * | 4/1987 | Humphrey | 340/572.2 |
| 4,964,951 | A | 10/1990 | Menyhert | |
| 5,240,561 | A | 8/1993 | Kaliski | |
| 5,541,002 | A | 7/1996 | Hosoi et al. | |
| 5,583,333 | A * | 12/1996 | Hoshino et al. | 235/493 |
| 5,637,196 | A * | 6/1997 | Ogawa et al. | 162/135 |
| 5,650,236 | A * | 7/1997 | Hirano et al. | 428/611 |
| 5,843,572 | A | 12/1998 | Yasuda et al. | |
| 5,873,978 | A | 2/1999 | Kuroyama et al. | |
| 6,011,475 | A * | 1/2000 | Herzer | 340/572.6 |
| 6,270,591 | B2 | 8/2001 | Chiriac et al. | |
| 6,585,857 | B2 | 7/2003 | Ruhrig | |
| 6,747,559 | B2 | 6/2004 | Antonenco et al. | |
| 6,786,586 | B2 | 9/2004 | Koga et al. | |
| 6,805,929 | B2 * | 10/2004 | Koga et al. | 428/32.11 |
| 7,816,002 | B2 | 10/2010 | Matsuda et al. | |
| 7,820,307 | B2 | 10/2010 | Kurihara et al. | |
| 7,862,918 | B2 | 1/2011 | Matsuda et al. | |
| 2005/0126730 | A1 | 6/2005 | Lorusso | |
| 2007/0014973 | A1 | 1/2007 | Koda et al. | |
| 2007/0146765 | A1 | 6/2007 | Matsuda et al. | |
| 2007/0178261 | A1 | 8/2007 | Levy et al. | |
| 2007/0243403 | A1 | 10/2007 | Matsuda et al. | |
| 2008/0013212 | A1 | 1/2008 | Fuse et al. | |
| 2008/0018674 | A1 | 1/2008 | Matsuda et al. | |
| 2008/0227010 | A1 | 9/2008 | Kurihara et al. | |
| 2009/0017334 | A1 | 1/2009 | Kurihara et al. | |

FOREIGN PATENT DOCUMENTS

| | | |
|---|---|---|
| JP | 52-038904 | 3/1977 |
| JP | 55-146500 | 10/1980 |
| JP | 6-202370 | 7/1994 |
| JP | A-7-32778 | 2/1995 |
| JP | 08-282093 | 10/1996 |
| JP | 10-143708 | 5/1998 |
| JP | 2000-284521 | 10/2000 |
| JP | 2001-126909 | 5/2001 |
| JP | 2001-316999 | 11/2001 |
| JP | 2001-335752 | 12/2001 |
| JP | 2002-040700 | 2/2002 |
| JP | 2002-220799 | 8/2002 |
| JP | 2003-005421 | 1/2003 |
| JP | 2003-103972 | 4/2003 |
| JP | 2003-202695 | 7/2003 |
| JP | 2003-295492 | 10/2003 |
| JP | 2004-021197 | 1/2004 |
| JP | 2004-190204 | 7/2004 |
| JP | 2004-284053 | 10/2004 |
| JP | A-2004-285524 | 10/2004 |
| JP | 2005-146477 | 6/2005 |
| JP | A-2005-213654 | 8/2005 |
| JP | A-2001-265183 | 9/2006 |
| JP | 2007-021884 | 2/2007 |
| JP | 2007-164293 | 6/2007 |
| JP | 2007-169837 | 7/2007 |
| JP | 2007-169842 | 7/2007 |
| JP | 2007-177333 | 7/2007 |

OTHER PUBLICATIONS

Machine translation ofdetailed description of JP 06-202370 A. Created on Apr. 8, 2010.*
Japanese Office Action, dated Apr. 20, 2010.
Notice of Reason for Rejection for Japanese Application No. 2005-373618 dated Jun. 21, 2011 (Translation included).
Office Action for Japanese Application No. 2005-373618 dated Mar. 8, 2011 (Translation included).
Bo Bian & David E. Laughlin, "Fabrication and nanostructure of oriented FePt particles," Journal of Applied Physics, 87(9): 6962-6964 (2000).
English Machine translation of JP 2005-273023, Japan (2005).
"Magnetic Barkkausen Noise" http://www.physics.queensu.ca/.about.lynann/mbnoise.html (last visited Jul. 7, 2010).
J. Yamasaki, et al., "Large Barkhausen discontinuities in Co-based amorphous wires with negative magnetostriction," Journal of Applied Physics, 63(8): 3949-3951 (1988).

(Continued)

*Primary Examiner* — Gerard Higgins
(74) *Attorney, Agent, or Firm* — Sughrue Mion, PLLC

(57) ABSTRACT

A recording medium comprising a magnetic material inside, and having a Taber abrasion amount of 10 mg or less. Also provided is a recording medium comprising a magnetic material inside, and having, in an environment of 23° C. and 50% RH, a surface electroresistivity of $1\times10^{9}$ Ω/sq to $2\times10^{11}$ Ω/sq and a volume electroresistivity of $1\times10^{10}$ Ωcm to $2\times10^{12}$ Ωcm.

16 Claims, 3 Drawing Sheets

(56) References Cited

OTHER PUBLICATIONS

K. J. Sixtus & L. Tonks, Propagation of Large Barkhausen Discontinuities, 37 Physical Rev. 930-58 (1932).

K. Mohri et al., "Large Barkhausen Effect and Matteucci Effect in Amorphous Magnetostrictive Wires for Pulse Generator Elements," MAG-21(5) IEEE Transactions on Magnetics, 2017-2019 (1985).

R.C. O'Handley, Domain wall kinetics in soft ferromagnetic metallic glasses, Journal of Applied Physics, 46(11): 4996-5001 (1975).

Robert C. O'Handley, Modern Magnetic Materials 20-23 (2000).

Office Action issued in a related U.S. Appl. No. 11/939,294 (now U.S. Patent 7,816,002), dated Aug. 21, 2009.

Office Action issued in a related U.S. Appl. No. 11/939,294 (now U.S. Patent 7,816,002), dated Jan. 21, 2010.

Office Action issued in a related U.S. Appl. No. 12/040,313 (now U.S. Patent 7,820,307), dated Mar. 30, 2009.

Office Action issued in a related U.S. Appl. No. 12/040,313 (now U.S. Patent 7,820,307), dated Sep. 1, 2009.

Office Action issued in a related U.S. Appl. No. 12/040,313 (now U.S. Patent 7,820,307), dated Dec. 31, 2009.

Office Action issued in a related U.S. Appl. No. 11/826,918 (now U.S. Patent 7,862,918), dated Apr. 14, 2010.

Office Action issued in a related U.S. Appl. No. 11/826,918 (now U.S. Patent 7,862,918), dated Sep. 25, 2009.

Office Action issued in a related U.S. Appl. No. 11/826,918 (now U.S. Patent 7,862,918), dated Jun. 19, 2009.

Office Action for Japanese Application No. 2005-373618 dated Nov. 1, 2011 (Translation included).

* cited by examiner

RECORDING MEDIUM

BACKGROUND

1. Technical Field

The present invention pertains to a recording medium, and relates to a recording medium which is used in an image forming apparatus. The present invention also relates to a recording medium which is used in an image forming apparatus utilizing the electrophotographic method, such as copying machines, printers, and facsimiles.

2. Related Art

In recent years, the laws have been enacted for prevention of information outflow in the fields of personal information protection, privacy marking system, information security, and the like. However, because of benefits and convenience of portability, storability, and the like of recording paper, outflow of personal information, secret information, and the like, which are printed on recording paper, has not been fully blocked at present. Therefore, it has been a pressing need to prevent outflow and forgery of secret information recorded on recording paper without impairing the benefits and convenience thereof.

SUMMARY

According to an aspect of the invention, there is provided a recording medium containing a magnetic material inside, and having a Taber abrasion amount of 10 mg or less.

BRIEF DESCRIPTION OF THE DRAWINGS

Exemplary embodiments of the present invention will be described in detail based on the following figures, wherein.

DETAILED DESCRIPTION

In a first exemplary embodiment of the present invention, a recording medium containing a magnetic material inside, and having a Taber abrasion amount of 10 mg or less is provided.

In a second exemplary embodiment of the present invention, a recording medium including a magnetic material inside, and having, in an environment of 23° C. and 50% RH, a surface electroresistivity of about $1\times10^9$ Ω/sq to $2\times10^{11}$ Ω/sq and a volume electroresistivity of about $1\times10^{10}$ Ωcm to $2\times10^{12}$ Ωcm is provided.

First, an example of an electrophotographic image forming apparatus is described as an image forming apparatus in which the recording media of the first and second exemplary embodiments can be used as recording media for image formation. The image forming apparatuses to which the recording medium of the first exemplary embodiment of the present invention is applicable is not limited to the image forming apparatus using the electrophotographic method, but may be selected from image forming apparatuses which utilize the ink jet method, such as ink jet recording apparatus. The image forming apparatuses to which the recording medium of the second exemplary embodiment of the present invention is applicable may be arbitrarily selected from electrophotographic image forming apparatuses, and are not limited to the form shown in FIG. 1. The following descriptions are common to the first and second exemplary embodiments unless otherwise mentioned.

Figure 1:
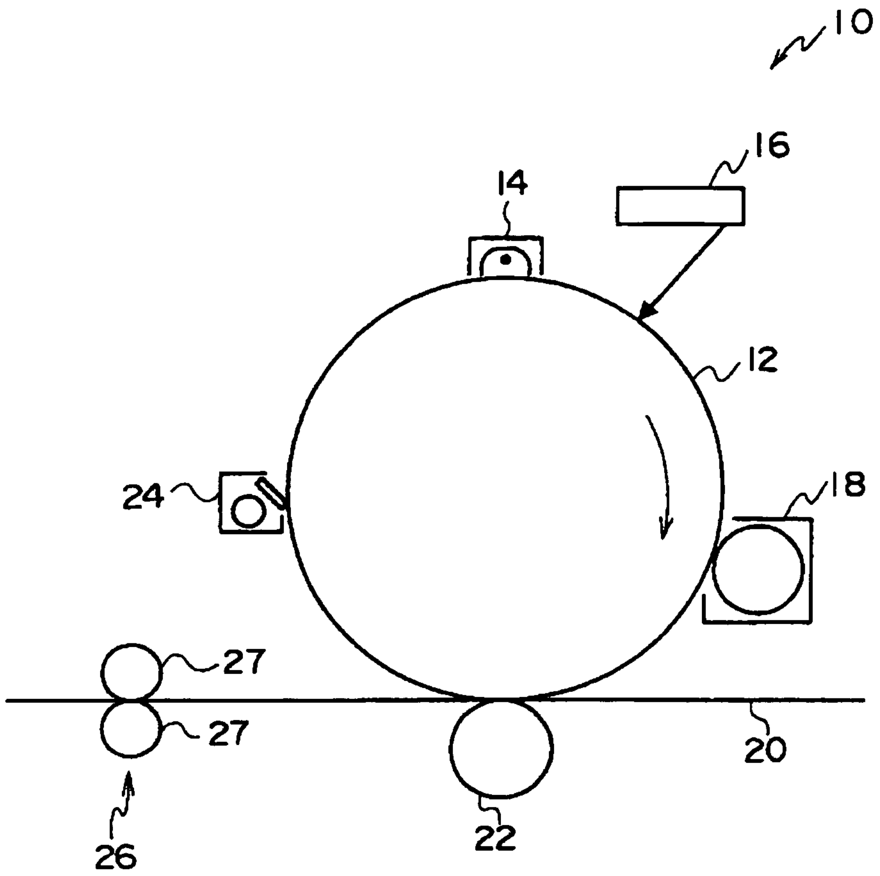
FIG. 1 is a schematic diagram illustrating an example of an image forming apparatus in which a recording medium according to an aspect of the present invention can be used.

As shown in FIG. 1, an image forming apparatus 10 includes an image carrier 12 which is rotated in a prescribed direction, and on which an electrostatic latent image is formed. In the vicinity of the image carrier 12, a charging apparatus 14, an exposure apparatus 16, a developing apparatus 18, a transfer apparatus 22, a cleaning apparatus 24, and a fixing apparatus 26 are provided along the direction of rotation of the image carrier 12. In addition, the image forming apparatus 10 is configured to have a control section (not shown) that controls various devices included in the image forming apparatus 10.

The charging apparatus 14 uniformly charges the surface of the image carrier 12. The exposure apparatus 16 scan-exposes the image carrier 12 with laser light modulated in accordance with image data inputted from an external apparatus (not shown) through an input/output section (not shown) by wire or wireless communication, whereby an electrostatic latent image is formed on the image carrier 12. The developing apparatus 18 develops the electrostatic latent image formed on the image carrier 12 with toner, thereby forming a toner image on the image carrier 12. A recording medium 20 is nipped between the transfer apparatus 22 and the image carrier 12 and transported, and the transfer apparatus 22 transfers the toner image formed on the image carrier 12 onto the recording medium 20 upon application of a transfer voltage by a power supply (not shown). The cleaning apparatus 24 removes the residual toner from the image carrier 12. The fixing apparatus 26 fixes the toner image that has been transferred onto the recording medium 20 on the recording medium 20.

The fixing apparatus 26 may conduct oilless fixing.

The fixing apparatus 26 holds the recording medium 20 under pressure, and is configured to have fixing rolls 27. The oilless fixing refers to the fixing method in which fixing is conducted in the state that the surface of the fixing roll 27 does not contain a release agent such as oil. In other words, fixing is achieved by the fixing apparatus 26 which includes no supply apparatus that supplies the release agent onto the surface of the fixing roll 27.

As the toner used in the present exemplary embodiment, polyester resins, styrene-acrylic resins, and the like can be cited as typical examples. For toner generation, methods such as the pulverization method or the polymerization method may be used.

The surface of the image carrier 12 in the image forming apparatus 10 is uniformly charged by the charging apparatus 14, and then is scan-exposed to laser light by the exposure apparatus 16. On the surface of the image carrier 12, an electrostatic latent image is formed by the scan-exposure to the laser light. When the electrostatic latent image formed on the image carrier 12 is brought to the region facing the location at which the developing apparatus 18 is disposed by the rotation of the image carrier 12, the electrostatic latent image is developed with the developing apparatus 18. By the development with the developing apparatus 18, a toner image corresponding to the electrostatic latent image is formed on the image carrier 12 (, which is hereinafter referred to as the developing process).

The recording medium 20 is supplied from a recording medium retention section (not shown) to a transport path (not shown) in the image forming apparatus 10 by a transporting apparatus (not shown) such as various transport rolls, and is transported to the region where it is nipped between the image carrier 12 and the transfer apparatus 22. When the toner image formation area on the image carrier 12 reaches the region where the image carrier 12 faces the transfer apparatus 22 simultaneously with the conveyance of the recording medium 20 nipped between the image carrier 12 and transfer apparatus 22, the toner image on the image carrier 12 is transferred onto the recording medium 20.

This transfer onto the recording medium 20 is carried out by the application of a voltage to the transfer apparatus 22, such as a transfer roll, by a power supply (not shown). With the voltage being applied to the transfer apparatus 22, an electric field which causes the respective toners constituting the toner image formed on the image carrier 12 to move toward the recording medium 20 is generated between the image carrier 12 and the transfer apparatus 22, so that the toner image on the image carrier 12 is transferred onto the recording medium 20 (, which is hereinafter referred to as the transfer process).

The toner image transferred onto the recording medium 20 is fixed on the recording medium 20 with a fixing apparatus (not shown) (this process is hereinafter referred to as the fixing process), so that an image is formed on the recording medium 20. The recording medium 20 having the image formed thereon is delivered to the outside of the image forming apparatus 10 by a delivery roll (not shown).

The recording medium of the first exemplary embodiment, which can be used as the recording medium 20 usable in the image forming apparatus 10 of the electrophotographic system, the ink jet system, or the like, for forming an image on a recording medium, contains a magnetic material inside thereof, and the Taber abrasion amount is in the range of 10 mg or less.

In addition, the recording medium 20 of the first exemplary embodiment has an internal bond strength defined in JAPAN TAPPI No. 18-2 of 0.1 N·m or more. JAPAN TAPPI No. 18-2 is incorporated herein by reference.

The Taber abrasion amount of the recording medium of the first exemplary embodiment is in the range of 10 mg or less as described above, and is preferably in the range of 8 mg or less.

When the Taber abrasion amount of the recording medium surface is smaller, the drop of the magnetic material off the recording medium may be suppressed more strongly.

If the Taber abrasion amount of the recording medium exceeds 10 mg, there will be a problem of drop off of the magnetic material.

Herein, the Taber abrasion amount in the present invention is determined as follows: the recording medium of the first exemplary embodiment whose moisture content has been controlled in conformity with JIS P8111 (which is incorporated herein by reference) is used for the measurement with a Rotary abrasion tester No. 430 manufactured by Toyo Seiki Seisaku-Sho Ltd. and an abrasive wheel CS-10 having an outside diameter of 50 mm under the conditions of an abrasion revolution speed of 60 rpm, a test load of 2.45 N (250 gf), a number of abrasion revolutions of 50 turns, and a measurement environment of 23° C. and 50% RH.

Figure 2B:
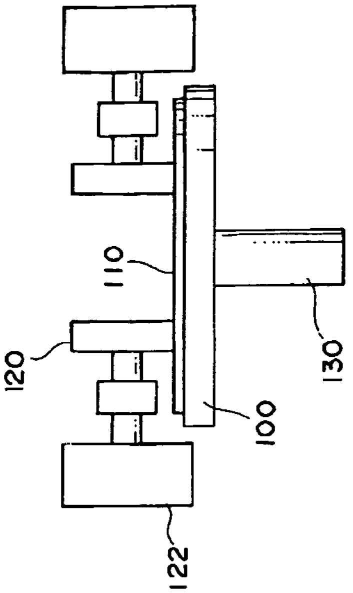
FIGS. 2A and 2B are explanatory drawings illustrating the state at which a Taber abrasion amount is measured.
Figure 2A:
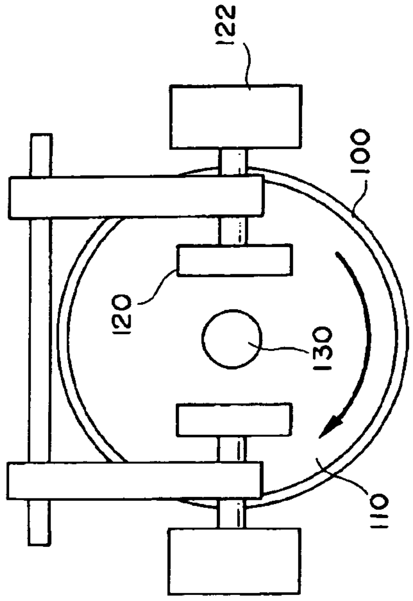

FIGS. 2A and 2B show an example of the state in which the measurement of the Taber abrasion amount is carried out. FIG. 2A is a drawing showing rotating state of the flat (circular) sample viewed from the direction perpendicular to the rotation plane, and FIG. 2B is a drawing showing rotating state of the sample viewed from the direction in parallel with the rotation plane.

Two abrasive wheels 120 contacts the test sample 110 fixed on the surface of the turntable 100 such that a load is applied to the test sample 110 by a weight 122. As the test sample 110 is turned together with the rotation of the turntable 100 supported by the spindle 130, the abrasive wheel 120 is turned passively, so that the portion of the test sample 110 that is in contact with the abrasive wheel 120 is gradually worn.

The Taber abrasion amount in the present invention is determined by measuring the mass of the recording medium of the first exemplary embodiment as the above-mentioned test sample 110 before and after the wear.

As described above, for the suppression of the dropping of the magnetic material of the recording medium, the strength of the recording medium against the friction force that is defined by the Taber abrasion amount is an important factor. However, if the strength of the recording medium surface is high while the strength of the inside of the recording medium is low, there is a possibility that, among other regions, the region containing the magnetic material cannot endure the friction force or the external stress, so that the magnetic material contained in the recording medium drops off.

When the recording medium 20 of the first exemplary embodiment is configured to have an internal bond strength defined in JAPAN TAPPI No. 18-2 of 0.1 N·m or more, as described above, the drop off of the magnetic material contained in the recording medium may be further prevented.

As described above, the internal bond strength of the recording medium 20 of the first exemplary embodiment is preferably 0.1 N·m or more, more preferably 0.15 N·m or more.

The upper limit of the internal bond strength may be 2 N·m or less, for example.

When the internal bond strength of the recording medium is less than 0.1 N·m, there is a problem in that image defects occur owing to drop off of the magnetic material.

As described above, the recording medium of the first exemplary embodiment containing the magnetic material inside may be configured to have a Taber abrasion amount in the range of 10 mg or less, and an internal bond strength defined in JAPAN TAPPI No. 18-2 of 0.1 N·m or more, whereby the drop off from the recording medium may be suppressed to reduce the wear due to the magnetic material in the transporting apparatus, transfer apparatus, cleaning apparatus, fixing apparatus, and the like even when the recording medium contains a magnetic material, which an inorganic material generally having high conductivity and higher strength than the substrate material (which will be described later). Therefore, image quality degradation may be suppressed.

Next, the configuration of the recording medium 20 of the first exemplary embodiment will be more specifically described.

The recording medium 20 of the first exemplary embodiment is configured to include a substrate in the shape of a sheet (substrate sheet) containing at least a substrate material, and optionally a magnetic material in accordance with the application. The recording medium may also comprise a pair of substrate sheets with the magnetic material sandwiched therebetween. Therefore, the recording medium 20 is configured to include a magnetic material inside.

The magnetic material contained in the inside of the recording medium of the first and second exemplary embodiments may exhibit a large Barkhausen effect.

Figure 3A:
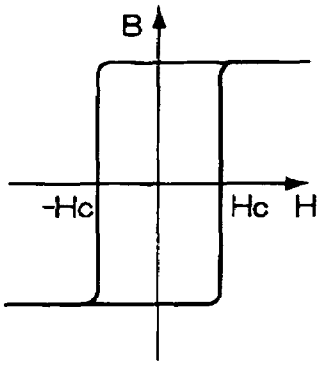
FIGS. 3A to 3C are explanatory drawings illustrating the large Barkhausen effect.
Figure 3B:
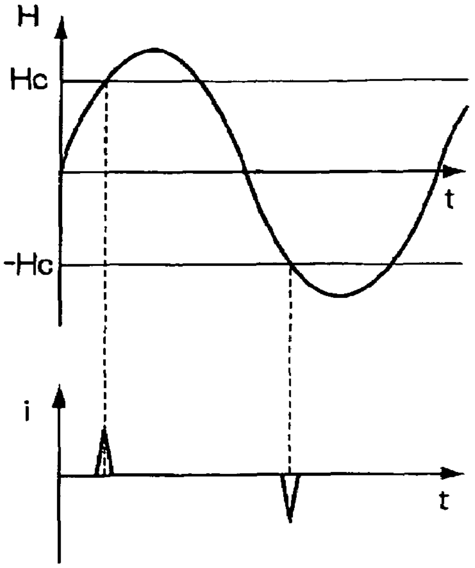
Figure 3C:
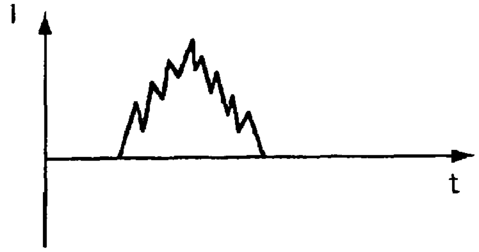

Herein, the large Barkhausen effect will be briefly described. FIGS. 3A to 3C are diagrams illustrating the large Barkhausen effect. The large Barkhausen effect refers to a phenomenon in which an abrupt reversal of magnetization occurs when a material which has a B—H characteristic as shown in FIG. 3A, in other words, a substantially rectangular hysteresis loop and a relatively low coercive force (Hc), (e.g., an amorphous magnetic material made of Co—Fe—Ni—B—Si) is placed in an alternating magnetic field. Therefore, when an alternating current is flown through an excitation coil to generate an alternating magnetic field and a magnetic material is placed in the alternating magnetic field, a current in the form of a pulse flows through a detection coil disposed in the vicinity of the magnetic material at the time of the magnetization reversal.

For example, when an excitation coil is used to generate an alternating magnetic field as shown at the upper graph in FIG. 3B and a recording medium is disposed in the alternating magnetic field generated, a pulse current as shown at the lower graph in FIG. 3B flows through the detection coil.

However, through the detection coil, the alternating current which is induced by the alternating magnetic field is also flown, and thus the pulse current is detected, being superposed on this alternating current. In addition, when a recording medium containing plural magnetic materials is placed in the alternating magnetic field, plural pulse currents are superposed, and thus a current as shown in FIG. 3C is detected.

The magnetic material to be contained in the inside of the recording medium of the first and second exemplary embodiments may be selected generally from permanent magnets, such as a rare earth-based permanent magnet containing neodymium (Nd)-iron (Fe)-boron (B) as the main component, a permanent magnet containing samarium (Sm)-cobalt (Co) as the main component, an alnico-based permanent magnet containing aluminum (Al)-nickel (Ni)-cobalt (Co) as the main component, and a ferrite-based permanent magnet containing barium (Ba) or strontium (Sr) and an iron oxide ($Fe_2O_3$) as the main components, soft magnetic materials, oxide soft magnetic materials, and the like. As the magnetic material which exhibits a large Barkhausen effect, it is possible to use an amorphous magnetic material whose basic composition is based on Fe—Co—Si or Co—FeNi. The term "body of the recording medium" used herein refers to the recording medium itself without magnetic material.

The geometry of the magnetic material is not particularly limited, provided that the geometry is suited for causing a large Barkhausen effect. In order to exhibit a large Barkhausen effect, a prescribed length relative to the cross-sectional area is necessary. Therefore, the magnetic material is preferably linear (in the shape of a wire), or in the shape of a strip, and is more preferably in the shape of a wire.

When the magnetic material is in the shape of a wire, it may have a diameter of 10 μm or more as a minimum diameter required to exhibit the large Barkhausen effect. In addition, the maximum diameter is not particularly limited. In order to suppress exposure of the magnetic material on the recording medium surface, the maximum diameter depends on the thickness of the recording medium. When the paper has a thickness of approximately 90 μm, for example, the maximum diameter is preferably 40 μm or less, and is more preferably 30 μm or less in the first exemplary embodiment, while, in the second exemplary embodiment, the maximum diameter is preferably 60 μm or less, and is more preferably 50 μm or less.

In addition, the length of the magnetic material may be 5 mm or more as a minimum length required to exhibit the large Barkhausen effect. The maximum length of the amorphous magnetic material may be such a length that the magnetic material contained in the inside of the recording medium is not exposed on the surface, and is not particularly limited. The maximum length may be 430 mm or less.

The substrate (for example, a substrate sheet) material means the main material constituting the substrate of the recording medium of the first and second exemplary embodiments, and is not particularly limited, provided that it can be processed into a sheet having a thickness and the like suitable for use in an image forming apparatus for recording an image on a recording medium, such as apparatuses of the electrophotographic system or the ink jet system.

For example, when the recording medium of the first or second exemplary embodiment is made up a paper substrate, a pulp fiber can be mentioned as the main material constituting the paper substrate.

The pulp fiber is not particularly limited, and may be selected from kraft pulp fibers of hardwood and/or softwood, sulfite pulp fibers, semichemical pulp fibers, chemiground pulp fibers, ground pulp fibers, refiner ground pulp fibers, and thermomechanical pulp fibers In addition, fibers manufactured by chemically modifying the cellulose or hemi-cellulose in these fibers may be used as required.

Further, one of the following fibers, or a combination of two or more of the following fibers can be used: cotton pulp fibers, hemp pulp fibers, kenaf pulp fibers, bagasse pulp fibers, viscose rayon fibers, regenerated cellulose fibers, copper ammonia rayon fibers, cellulose acetate fibers, polyvinyl chloride-based fibers, polyacrylonitrile-based fibers, polyvinyl alcohol-based fibers, polyvinylidene chloride-based fibers, polyolefin-based fibers, polyurethane-based fibers, polyvinyle alcohol copolymers, fluorocarbon-based fibers, glass fibers, carbon fibers, alumina fibers, metallic fibers, silicon carbide fibers, and the like.

In addition, the Taber abrasion amount and the internal bond strength may be improved, as necessary, by using a fiber obtained by impregnating any of the above-mentioned pulp fibers with a synthetic resin, such as a polyethylene, a polypropylene, a polystyrene, a polyvinyl chloride, or a polyester, or by using a fiber obtained by thermally fusing a synthetic resin, such as a polyethylene, a polypropylene, a polystyrene, a polyvinyl chloride, or a polyester into any of the above-mentioned pulp fibers.

In addition, the above-mentioned pulp fibers may further be compounded with recycled fibers of wood free paper and wood-containing paper. The amount of recycled fiber to be contained is determined in accordance with the application, the purpose, and the like. For example, when a recycled fiber is included from the viewpoint of resource protection, the amount thereof is preferably 10% by mass or more, and more preferably 30% by mass or more, relative to the total amount of the pulp fiber contained in the paper substrate.

To the paper substrate for use in the recording media of the first and second exemplary embodiments, a filler may be added in order to adjust the opacity, whiteness, and surface quality.

In the recording medium of the first exemplary embodiment, the amount of the filler to be added is preferably 10% by mass or less, and more preferably 7% by mass or less, relative to the solid content (dry weight) of the paper substrate so as to make the recording medium of the first exemplary embodiment have an internal bond strength of 0.1 N·m or more.

If the proportion of the filler to the solid content of the paper substrate exceeds 10% by mass, the hydrogen bond generated within the paper substrate material, such as fibers constituting the paper substrate, is broken, or the distance between fibers constituting the paper substrate tends to be increased, resulting in reduction of the bond strength in the main material constituting the paper substrate, and drop of the magnetic material off the recording medium.

The amount of the filler contained in the recording medium can be determined by subjecting the recording medium of the first exemplary embodiment to the incineration treatment in conformity with the method as defined in JIS P8128 (, which is incorporated by reference) (at 575° C. and for 4 hr), and then to elemental analysis of the residual ash (the ash content defined in JIS P8128) according to the method, such as the IPC emission spectrometry, and calculating the amounts of the magnetic material and the filler contained in the paper substrate of the recording medium.

Among the above-mentioned fillers, the thermoplastic organic pigments are preferable because, when the recording medium of the first exemplary embodiment is used in an electrophotographic image forming apparatus, they may fuse between the materials constituting the paper substrate by the heat applied for fixing the toner image formed on the recording medium.

The type of the filler which can be used in the recording medium or the paper substrate is not particularly limited, and may be an inorganic filler or an organic filler. Examples of the inorganic filler include calcium carbonate-based fillers, such as ground calcium carbonates, precipitated calcium carbonates, and chalks; silicates such as kaolin, calcined clays, pyrophyllites, sericites, and talcs, titanium dioxides, calcium sulfates, barium sulfates, zinc oxides, zinc sulfides, zinc carbonates, aluminum silicates, calcium silicates, magnesium silicates, synthetic silicas, aluminum hydroxides, aluminas, white carbons, saponites, dolomites, calcium montmorillonites, sodium montmorillonites, and bentonites. Examples of the organic filler include organic pigments such as urea resins, styrenes, and acryl-based plastic pigments, polyethylenes, chitosan particles, cellulose particles, polyamino acid particles, and particles of thermoplastic resins such as polyester-based resins and styrene-acryl based resins. From the viewpoint of improvement in image quality maintenability and whiteness in the electrophotographic method, a calcium carbonate may be added during production of a neutralized paper.

Further, to the paper substrate constituting the recording media of the first and second exemplary embodiments, various chemicals, such as a sizing agent, may be internally or externally added.

As the type of sizing agent which can be added to the paper substrate, rosin-based sizing agents, synthesitic sizing agents, petroleum resin-based sizing agents; neutral sizing agents, and the like, can be mentioned. Further, a sizing agent, such as aluminum sulfate or cationized starch, and a fixing agent may be used in combination.

Among the above-mentioned sizing agents, it is preferable to use a neutral sizing agent, such as an alkenyl anhydrous succinic acid-based sizing agent, an alkyl ketene dimer, an alkenyl ketene dimer, a neutral rosin, a petroleum sizing agent, an olefin based resin, or a styrene-acryl based resin, from the viewpoint of shelflife of the recording medium after image formation in an electrophotographic or ink jet image forming apparatus or the like. In addition, as a surface sizing agent, an oxidation modified starch, an enzymatically modified starch, a polyvinyl alcohol, a modified cellulose such as carboxymethyl cellulose, a styrene-acryl based latex, a styrene maleic acid-based latex, and an acryl-based latex, may be used alone or in combination.

Further, a paper strength additive may be internally or externally added to the paper substrate constituting the recording medium of the first exemplary embodiment.

Examples of the paper strength additive include starches, modified starches, plant gums, carboxymethyl celluloses, polyvinyl alcohols, modified polyvinyl alcohols, polyacrylamides, styrene-anhydrous maleic acid copolymers, vinyl chloride-vinyl acetate copolymers, styrene-butadiene copolymers, polyacrylic acid ester urea-formaldehyde resins, melamine-formaldehyde resins, dialdehyde starches, polyethylene imines, epoxydated polyamides, polyamide-epichlorohydrin based resins, methylolated polyamides, and chitosan derivatives. Only one paper strength additive may be used, or two or more paper strength additives may be used in combination.

Other than the above, various auxiliary agents which are contained in ordinary paper media, such as dyes and pH adjusters, may be used as appropriate.

The recording medium of the first exemplary embodiment may be manufactured by mixing the main material constituting the paper substrate with the other materials to be contained in the paper substrate; making paper therefrom to prepare plural paper substrates; dispersing the magnetic material between the plural paper substrates; adhering the paper substrates to each other; and further forming a surface layer (which will be described later). As an alternative, the recording medium may be manufactured by mixing the main material constituting the paper substrate, the other materials to be contained in the paper substrate, and the magnetic material; and making paper therefrom to provide a sheet of one or more layers; and forming a surface layer (which will be described later).

The recording medium of the second exemplary embodiment may be manufactured by mixing the main material constituting the paper substrate with the other materials; making paper therefrom to provide plural paper substrates; dispersing the magnetic material between the plural paper substrates; adhering the paper substrates to each other; and further coating a size press liquid (which will be described later), and forming a pigment coating layer. As an alternative, the recording medium may be manufactured by mixing the main material constituting the paper substrate, the other materials constituting the paper substrate, and the magnetic material; making paper therefrom to provide a sheet of one or more layers; and coating the size press liquid, and forming the pigment coating layer.

The papermaking method is not particularly limited. The multi-layer papermaking method, or any of the conventionally known Fourdrinier paper machine, cylinder paper machine, twin-wire paper machine, and the like, may be used. Either acidic or neutralized paper may be used.

As the method of multi-layer papermaking, any of the cylinder papermaking method, the Fourdrinier papermaking method, the Fourdrinier/cylinder combined papermaking method, the multi-head box papermaking method, and the tanmo/Fourdrinier papermaking method may be used. For example, any of the methods described in detail in "The Latest Papermaking Technology—Theory and Practice" authored by Saburo Ishiguro (Seishi-Kagaku Kenkyujo, 1984); or the cylinder papermaking method using a series of plural cylinders may be used.

When the multicylinder method is used for multi-layer papermaking, the magnetic material in the shape of a wire can be contained in the inside of a recording medium, thus, the effects of the magnetic material contained in the recording medium on the electric resistance value at the time of transferring the toner image onto the recording medium may be suppressed as compared to the case where the single-layer papermaking method is used, whereby the generation of white spots around the region of the recording medium that contains the magnetic material may be suppressed.

In the first exemplary embodiment, it is desirable that the magnetic material should be not exposed on the surface of the recording medium. If the magnetic material is exposed on the surface of the recording medium, the magnetic material is poorly entangled with the main material, such as a pulp fiber, so that the magnetic material easily drop off the recording medium due to the external stress, the transfer electric field, or the like. Further, there is a disadvantage in that abrasion or damage is likely to occur on various devices of various apparatuses (for example, the transporting apparatus for transporting the recording medium, the transfer apparatus, the fixing apparatus, and the like) including the contacting members that contact the recording medium, provided in the imaging apparatus, due to the hardness of the magnetic material exposed on the surface of the recording medium.

Further, when the recording medium is positioned in the electric field generated between the image carrier 12 and the transfer apparatus 22 in the transfer process, leakage occurs in some cases. Therefore, it is desirable that the magnetic material be present inside of the recording medium.

The method for placing the magnetic material inside the recording medium is not particularly limited, and any of conventionally known methods can be used. In an exemplary method, paper substrates are prepared by multi-layer papermaking such that the outermost surface layer does not contain a magnetic material, and such that the inner layer contains a magnetic material; by this method, the magnetic material is present in the inner layer or at the interface between the paper substrates. Further, exposure of the magnetic material on the surface of the recording medium may be suppressed by providing a surface layer on the paper substrate.

Herein, in the recording medium of the first exemplary embodiment, the strength of the recording medium surface is required for bringing the strength of the recording medium against the friction force defined in terms of the Taber abrasion amount of the recording medium surface to within the above specified range (1 mg to 10 mg). Protection of the surface with a high polymer (resin) or the like is effective in improving the strength of the surface of the recording medium.

Therefore, a surface layer may be formed on the recording medium of the first exemplary embodiment by coating, on the paper substrate, a coating solution that contains an adhesive (such as an oxidation modified starch or an enzymatically modified starch), a pigment, and a material having a high film-forming ability that enables the Taber abrasion amount of the recording medium surface to be within the above specified range.

This surface layer is the layer constituting the surface of the recording medium, and is formed by coating the coating solution on the surface of the outermost paper substrate of the plural paper substrates having the magnetic material sandwiched therebetween, or on the surface of a paper substrate containing the magnetic material inside.

The adhesive to be contained in the coating solution may be a water-soluble high molecular compound and/or a water-dispersible high molecular compound. Examples thereof include starches, such as cationic starches, amphoteric starches, oxidized starches, enzymatically modified starches, thermochemically modified starches, esterified starches, and etherified starches; cellulose derivatives, such as carboxy methylcelluloses and hydroxy ethylcelluloses; natural or semisynthetic high molecular compounds, such as gelatines, caseins, soybean proteins, and natural rubbers; polyvinyl alcohols; polydienes, such as isoprenes, neoprenes, and polybutadienes; polyalkenes, such as polybutenes, polyisobutylenes, polypropylenes, and polyethylenes; vinyl-based polymers or copolymers, such as polymers or copolymers of vinyl halides, vinyl acetates, styrenes, (meth)acrylic acids, (meth)acrylic acid esters, (meth)acrylic amides, and methylvinyl ethers; synthetic rubber latexes, such as styrene-butadiene based ones, methyl methacrylate-butadiene based ones; and synthetic high molecular compounds, such as polyurethane resins, polyester resins, polyamide resins, olefin-anhydrous maleic acid resins, and melamine resins. Only one of the above adhesives may be used, or a mixture of two or more of the above adhesives may be used. However, usable adhesives are not limited to those mentioned above. From the viewpoint of manufacturing cost, starch, which is lower in cost, may be used.

Examples of the pigment to be contained in the coating solution include mineral pigments, such as ground calcium carbonates, precipitated calcium carbonates, kaolin, calcined kaolin, structural kaolin, delaminated kaolin, talcs, calcium sulfates, barium sulfates, titanium dioxides, zinc oxides, aluminas, magnesium carbonates, magnesium oxides, silicas, alumino magnesium silicates, calcium silicates in the shape of fine particles, magnesium carbonates in the shape of fine particles, precipitated calcium carbonate in the shape of fine particles, white carbons, bentonites, zeolites, sericites, and smectites; organic pigments, such as polystyrene resins, styrene-acrylic copolymer resins, urea resins, melamine resins, acrylic resins, vinylidene chloride resins, benzoguanamine resins, as well as fine hollow particles and through-hole type particles thereof. Only one pigment may be used, or two or more pigments may be used.

The compounding ratio of the adhesive to the pigment in the coating solution may be in the range of 5 to 50 parts by mass relative to 100 parts by mass of the pigment. If the compounding ratio of the adhesive relative to 100 parts by mass of the pigment is less than 5 parts by mass, there is a problem in that good white paper glossiness cannot be obtained owing to erosion of the surface of the paper substrate by the resin liquid when the coating solution is coated on the paper substrate to form a surface layer on the paper substrate and then a resin layer is further applied in order to obtain a high gloss image. In addition, if the compounding ratio of the adhesive relative to 100 parts by mass of the pigment exceeds 50 parts by mass, there is a problem in that good white paper glossiness cannot be obtained due to roughness on the surface of the pigment-coated surface caused by the bubbles generated at the time of coating the coating solution on the paper substrate.

The resin to be used for the resin layer is not particularly limited, and may be selected from known thermoplastic resins. Examples thereof include resins having an ester linkage; polyurethane resins; polyamide resins, such as urea resins; polysulfone resins; polyvinyl chloride resins, polyvinylidene chloride resins, vinyl chloride-vinyl acetate copolymer resins, vinyl chloride-vinyl propionate copolymer resins; polyol resins, such as polyvinyl butyral resins; cellulose resins, such as ethylcellulose resins and cellulose acetate resins; polycaprolactone resins, styrene-anhydrous maleic acid resins, polyacrylonitrile resins, polyether resins, epoxy resins, phenolic resins; polyolefin resins, such as polypropylene resins and polyethylene resins; copolymer resins of an olefin (such as ethylene or propylene) and another vinyl monomer; and acrylic resins.

Examples of the material having a high film-forming ability to be contained in the coating solution include polyvinyl alcohols having a saponification degree of 90 mol % or more, modified polyvinyl alcohols, styrene-anhydrous maleic acid copolymers, vinyl chloride-vinyl acetate copolymers, styrene-butadiene copolymers, and polyacrylic acid esters.

Into the coating solution, various auxiliary agents can be further added as necessary, such as a surfactant, a pH adjuster, a viscosity adjuster, a softening agent, a gloss imparting agent, a dispersing agent, a fluidity modifier, a conductance inhibitor, a stabilizer, an antistatic agent, a crosslinking agent, an oxidation inhibitor, a sizing agent, a fluorescent whitening agent, a coloring agent, an ultraviolet absorber, an antifoaming agent, a water-proof agent, a plasticizer, a lubricant, an antiseptic agent, and a flavoring agent.

For applying the coating solution onto the paper substrate so as to form the surface layer, a known coating apparatus can be generally used, such as a size press, a blade coater, an air knife coater, a roll coater, a reverse roll coater, a bar coater, a curtain coater, a die coater, a gravure coater, a Champflex coater, a brush coater, a two-roll or metering blade type size press coater, a bill-blade coater, a short-dwell coater, or a gate roll coater.

The coating solution can be coated on the paper substrate surface by such a coating method to form a surface layer. The amount of the coating solution to be applied per side is preferably in the range of 0.8 to 3.0 $g/m^2$ in terms of solid content (dry mass), and is more preferably in the range of 1.0 to 3.0 $g/m^2$.

If the amount is less than 0.8 $g/m^2$, the recording medium surface has insufficient strength, and a Taber abrasion amount exceeding the specified range in some cases. If the amount exceeds 3.0 $g/m^2$, there could be a disadvantage in that the surface becomes tacky particularly in a high humidity environment, thus causing paper transport failures and the like in the image forming apparatus 10.

The surface layer is provided on one surface or both surfaces of the paper substrate to become the outermost layer(s) of the recording medium. The surface layer may have only one layer or may have a multi-layer structure including two or more intermediate layers as necessary. When the coating solutions are coated on the both surfaces of the recording medium, or when the surface layer has a multi-layer structure, the amounts of the coating solution for forming the respective layers are not necessarily the same, and the kinds and amounts of the materials contained in each coating solution are not necessarily the same. Such factors can be selected appropriately in accordance with the desired quality level as long as the ranges specified in the exemplary embodiments of the invention are satisfied.

From the viewpoint of prevention of curl, the surface layer may be formed on both surfaces of the recording medium.

The recording medium of the first exemplary embodiment may be subjected to a smoothing treatment using a smoothing treatment apparatus, such as a super calender, a gloss calender, or a soft calender, after the surface layer is formed. In addition, the smoothing may be conducted on-machine or off-machine as appropriate. The form of the compression apparatus, the number of compression nips, the heating temperature, and the like may be adjusted as appropriate as with ordinary smoothing treatment apparatuses.

On the other hand, as the method for disposing the magnetic material between the paper substrates, the following methods can be mentioned as examples. In an exemplary method, an adhesive layer is provided on one surface of at least one of the paper substrates, and then the magnetic material alone is scattered on the adhesive layer, and then the other paper substrate is adhered onto the adhesive layer. In another exemplary method, the magnetic material is dispersed in advance in the adhesive, and then the adhesive containing the magnetic material is applied onto one surface of one of the paper substrates, and then the other paper substrate is adhered thereon.

In this case, after the magnetic material is distributed between the paper substrates and the paper substrates are adhered to each other, the surface layer may be formed on the paper substrate surface to form a recording medium.

The adhesive usable in the adhesive layer may be a water-based or solvent-based adhesive. The solvent-based adhesive may be, specifically, an adhesive selected from a starch, a modified starch, a PVA, a carboxy methylcellulose, a urethane-based adhesive, a polyester-based adhesive, an epoxy-based adhesive, a rubber-based adhesive, a cyanoacrylate-based adhesive, an emulsion-based adhesive, or the like, and is preferably a polyester-based adhesive from the viewpoint of safety. Such adhesives may be provided by coating. As an alternative, a pressure sensitive adhesive double coated tape may be used. However, from the viewpoint of not impairing the electrophotographic characteristic required for the recording medium when used in an electrophotographic image forming apparatus, the surface electroresistivity of the recording medium may be adjusted in the range of $1\times10^9$ Ω/sq to $5\times10^{11}$ Ω/sq.

This surface electroresistivity can be determined by carrying out a measurement in conformity with JIS K6911 (, which is incorporated herein by reference) in the pretreatment and measurement environment defined in JIS P8111 (, which is incorporated herein by reference).

In order to adjust the electroresistivity of the recording medium such that the surface electroresistivity is in the specified range, an organic or inorganic material or a mixture of two or more materials selected from organic and inorganic materials may be added to the paper substrate, and the type and addition amount of the material may be controlled adequately such that the surface electroresistivity is in the specified range. Examples of the inorganic material include sodium chloride, potassium chloride, calcium chloride, sodium sulfate, zinc oxide, titanium dioxide, tin oxide, aluminum oxide, and magnesium oxide. Examples of the organic material include alkyl phosphoester salt, alkyl sulfuric ester salt, sodium sulfonate salt, and quaternary ammonium salt.

Among these materials, it is desirable to use a non-halogen conductive agent, such as sodium sulfate, from the viewpoint of environment protection.

The basis weight (JIS P8124 (, which is incorporated herein by reference)) of the recording medium of the first exemplary embodiment is not particularly specified, but may be, for example, 60 $g/m^2$ or more. If the basis weight is less than 60 $g/m^2$, the stiffness of the recording medium is decreased; as a result, when used in an electrophotographic image forming apparatus, there occurs problems in that the recording medium winds around the fixing apparatus in the fixing process in which the transferred toner image on the recording medium is fixed, and in that image defects easily occurs due to failure to separate from the fixing apparatus. Likewise, when the basis weight is less than 60 $g/m^2$, there are problems upon application to an electrophotographic or ink jet image forming apparatus, in that the magnetic material contained in the recording medium is easily exposed on the recording medium surface, in that the magnetic material drops off the recording medium, and in that the visibility of the printed image is worsened due to the presense of visible magnetic material on the recording medium surface.

Further, when the recording medium for use is finished, the moisture content may be adjusted with a paper machine or the like during preparation of the paper substrate, such that the product moisture content immediately after a moisture proof packaging containing the recording medium is opened is in an adequate range, specifically, approximately from 3 to 6.5% by mass, more preferably approximately from 4.5 to 5.5% by mass. In order to prevent moisture absorption or desorption of the manufactured recording medium during storage, it is preferable to pack a predetermined number of sheets of the recording medium, using a moisture proof packaging paper such as a polyethylene laminated paper, or a material such as polypropylene.

Also in the second exemplary embodiment, it is desirable that the magnetic material should be not exposed on the surface of the recording medium. If the magnetic material is exposed on the recording medium surface, when the recording medium is positioned in the electric field generated between the image carrier 12 and the transfer apparatus 22 in the transfer process, leakage occurs in some cases. Therefore, it is desirable that the magnetic material be present inside of the recording medium.

The method for placing the magnetic material inside the recording medium is not particularly limited, and any of conventionally known methods can be used. In an exemplary method, paper substrates are prepared by multi-layer paper-making such that the outermost surface layer does not contain a magnetic material, and such that the inner layer contains a magnetic material; by this method, the magnetic material is present in the inner layer or at the interface between the paper substrates.

In the second exemplary embodiment, from the viewpoint of improving the surface strength and the like, the surface of the paper substrate (the surface of the outermost paper substrate if the recording medium is composed of plural paper substrates) may be appropriately provided with a sizing agent, such as a rosin-based sizing agent, a synthetic sizing agent, a petroleum resin-based sizing agent, or a neutral sizing agent, to such a degree that the absorption of an aqueous liquid is not inhibited. Further, a sizing agent, such as aluminum sulfate or cationized starch, and an interfiber fixing agent may be used in combination.

In the second exemplary embodiment, it is possible to apply a size press liquid onto the surface of the paper substrate (the surface of the outermost paper substrate if the recording medium is composed of plural paper substrates).

The binder usable in the size press liquid may be an unprocessed starch, such as corn starch, potato starch, or tapioka starch, or a processed starch, such as enzymatically modified starch, phosphoric acid esterified starch, cationized starch, or acetylated starch. The binder may be selected from water-soluble high polymers, such as polyethylene oxide, polyacrylamide, sodium polyacrylate, sodium alginate, hydroxymethyl cellulose, carboxymethyl cellulose, methyl cellulose, polyvinyl alcohol, guar gum, casein, and curdlan, and derivatives thereof. The binder may also be a mixture of one or more of the above binders. However, usable binders are not limited to those mentioned above. From the viewpoint of manufacturing cost, starches, which are lower in cost, are often used.

In order to adjust the surface electroresistivity and the volume electroresistivity of the recording medium of the second exemplary embodiment such that the surface electroresistivity and the volume resisitivity are in the specified ranges, an organic or inorganic material or a mixture of two or more materials selected from organic and inorganic materials may be added to the recording medium of the second exemplary embodiment. Examples of the inorganic material include sodium chloride, potassium chloride, calcium chloride, sodium sulfate, zinc oxide, titanium dioxide, tin oxide, aluminum oxide, and magnesium oxide. Examples of the organic material include alkyl phosphoester salt, alkyl sulfuric ester salt, sodium sulfonate salt, and quaternary ammonium salt. Such an inorganic or organic material may be added to the recording medium by including the material in the size press liquid, and coating the size press liquid on the surface of the paper substrate.

In the second exemplary embodiment, for applying the size press liquid onto the surface of the paper substrate (the surface of the outermost paper substrate if the recording medium is composed of plural paper substrates), a usually used coating method can be selected such as a size press, a Sym size, a gate roll, a roll coater, a bar coater, an air knife coater, a rod blade coater, or a blade coater.

The recording medium of the second exemplary embodiment may be used as a coated paper after formation of a pigment coating layer through application of a coating solution for the pigment coating layer that is mainly include an adhesive and a pigment, onto at least one surface the recording medium.

In the second exemplary embodiment, a resin layer may be provided on this pigment coating layer in order to obtain a high gloss image.

The resin to be used for the resin layer is not particularly limited, and may be selected from known thermoplastic resins. Examples thereof include resins having an ester linkage; polyurethane resins; polyamide resins, such as urea resins; polysulfone resins; polyvinyl chloride resins, polyvinylidene chloride resins, vinyl chloride-vinyl acetate copolymer resins, vinyl chloride-vinyl propionate copolymer resins; polyol resins, such as polyvinyl butyral resins; cellulose resins, such as ethylcellulose resins and cellulose acetate resins; polycaprolactone resins, styrene-anhydrous maleic acid resins, polyacrylonitrile resins, polyether resins, epoxy resins, phenolic resins; polyolefin resins, such as polypropylene resins and polyethylene resins; copolymer resins of an olefin (such as ethylene or propylene) and another vinyl monomer; and acrylic resins.

In the second exemplary embodiment, the adhesive to be contained in the coating solution for forming a pigment coating layer may be a water-soluble high molecular compound and/or a water-dispersible high molecular compound. Examples thereof include starches, such as cationic starches, amphoteric starches, oxidized starches, enzymatically modified starches, thermochemically modified starches, esterified starches, and etherified starches; cellulose derivatives, such as carboxy methylcelluloses and hydroxy ethylcelluloses; natural or semisynthetic high molecular compounds, such as gelatines, caseins, soybean proteins, and natural rubbers; polyvinyl alcohols; polydienes, such as isoprenes, neoprenes, and polybutadienes; polyalkenes, such as polybutenes, polyisobutylenes, polypropylenes, and polyethylenes; vinyl-based polymers or copolymers, such as vinyl halides, vinyl acetates, styrenes, (meth)acrylic acids, (meth)acrylic acid esters, (meth)acrylic amides, and methylvinyl ethers; synthetic rubber latexes, such as styrene-butadiene based ones, methyl methacrylate-butadiene based ones; and synthetic high molecular compounds, such as polyurethane resins, polyester resins, polyamide resins, olefin-anhydrous maleic acid resins, and melamine resins. Only one of the above adhesives may be used, or a mixture of two or more of the above adhesives may be used, in accordance with the target quality of the recording medium.

In the second exemplary embodiment, examples of the pigment to be contained in the coating solution for a pigment coating layer include mineral pigments, such as ground calcium carbonates, precipitated calcium carbonates, kaolin, calcined kaolin, structural kaolin, delaminated kaolin, talcs, calcium sulfates, barium sulfates, titanium dioxides, zinc oxides, aluminas, magnesium carbonates, magnesium oxides, silicas, alumino magnesium silicates, calcium silicates in the shape of fine particles, magnesium carbonates in the shape of fine particles, precipitated calcium carbonate in the shape of fine particles, white carbons, bentonites, zeolites, sericites, and smectites; organic pigments, such as polystyrene resins, styrene-acrylic copolymer resins, urea resins, melamine resins, acrylic resins, vinylidene chloride resins, benzoguanamine resins, as well as fine hollow particles and through-hole type particles thereof. Only one pigment may be used, or two or more pigments may be used.

In the second exemplary embodiment, the compounding ratio of the adhesive to the pigment in the coating solution for a pigment coating layer may be in the range of 5 to 50 parts by mass relative to 100 parts by mass of the pigment. If the compounding ratio of the adhesive relative to 100 parts by mass of the pigment is less than 5 parts by mass, there is a problem in that good white paper glossiness cannot be obtained owing to erosion of the surface of the paper substrate by the resin liquid when the resin layer is further coated after the coating solution for a pigment coating layer is coated on the paper substrate to form a pigment coating layer on the paper substrate. In addition, if the compounding ratio of the adhesive relative to 100 parts by mass of the pigment exceeds 50 parts by mass, there is a problem in that good white paper glossiness cannot be obtained due to roughness on the surface of the pigment-coated surface caused by the bubbles generated at the time of coating the coating solution for a pigment coating layer on the paper substrate.

In the second exemplary embodiment, into the coating solution for a pigment coating layer, various auxiliary agents can be further added as necessary, such as a surfactant, a pH adjuster, a viscosity adjuster, a softening agent, a gloss imparting agent, a dispersing agent, a fluidity modifier, a conductance inhibitor, a stabilizer, an antistatic agent, a crosslinking agent, an oxidation inhibitor, a sizing agent, a fluorescent whitening agent, a coloring agent, an ultraviolet absorber, an antifoaming agent, a water-proof agent, a plasticizer, a lubricant, an antiseptic agent, and a flavoring agent.

The amount of the coating solution for a pigment coating layer to be applied onto the recording medium is selected as appropriate in accordance with the purpose of use of the recording medium of the second exemplary embodiment, and is generally an amount that can completely cover the irregularities on the surface of the recording medium. The amount may be from 2 to 8 $g/m^2$ in terms of a dry weight.

In the second exemplary embodiment, the coating solution for a pigment coating layer may be further applied onto the paper substrate surface to which the size press liquid has been applied, generally with a known coating apparatus, such as a blade coater, an air knife coater, a roll coater, a reverse roll coater, a bar coater, a curtain coater, a die coater, a gravure coater, a Champflex coater, a brush coater, a two-roll or metering blade type size press coater, a bill-blade coater, a short-dwell coater, or a gate roll coater.

In the second exemplary embodiment, the pigment coating layer is provided on one surface or both surfaces of the paper substrate to become the outermost layer(s) of the recording medium. The surface layer may have only one layer or may have a multi-layer structure including two or more intermediate layers as necessary. When the coating solutions are coated on the both surfaces of the recording medium, or when the surface layer has a multi-layer structure, the amounts of the coating solution for forming the respective layers are not necessarily the same, and the kinds and amounts of the materials contained in each coating solution are not necessarily the same. Such factors can be selected appropriately in accordance with the desired quality level as long as the ranges specified in the exemplary embodiments of the invention are satisfied.

In the second exemplary embodiment, when a pigment coating layer is provided on one surface of the recording medium, the other surface may be provided with a synthetic resin layer; a coating layer including an adhesive, a pigment, and the like; an antistatic layer, or the like, so as to prevent curl, so as to impart printability, and so as to impart paper feeding/delivery suitability, and the like.

Further, various application suitabilities may be naturally imparted by providing the other surface of the recording medium with a variety of post treatments, such as those for tacky adhesion, magnetism, flame resistance, heat resistance, waterproof, oilproof, slip prevention.

In the second exemplary embodiment, after the paper substrate surface is coated with the sizing agent, the size press liquid, the coating solution for a pigment coating layer, and the like as required, the recording medium of the second exemplary embodiment may be subjected to a smoothing treatment using a smoothing treatment apparatus, such as a super calender, a gloss calender, or a soft calender. In addition, the smoothing may be conducted on-machine or off-machine as appropriate. The form of the compression apparatus, the number of compression nips, the heating temperature, and the like may be adjusted as appropriate as with ordinary smoothing treatment apparatuses.

In the second exemplary embodiment, as the method for disposing the magnetic material between the paper substrates, the following methods can be mentioned as examples. In an exemplary method, an adhesive layer is provided on one surface of at least one of the paper substrates, and then the magnetic material alone is scattered on the adhesive layer, and then the other paper substrate is adhered onto the adhesive layer. In another exemplary method, the magnetic material is dispersed in advance in the adhesive, and then the adhesive containing the magnetic material is applied onto one surface of one of the paper substrates, and then the other paper substrate is adhered thereon.

In this case, after the magnetic material is distributed between the paper substrates and the paper substrates are adhered to each other, the pigment coating layer may be formed on the paper substrate surface to form a recording medium.

The adhesive usable in the adhesive layer may be a water-based or solvent-based adhesive. The solvent-based adhesive may be, specifically, an adhesive selected from a starch, a modified starch, a PVA, a carboxy methylcellulose, a urethane-based adhesive, a polyester-based adhesive, an epoxy-based adhesive, a rubber-based adhesive, a cyanoacrylate-based adhesive, an emulsion-based adhesive, or the like, and is preferably a polyester-based adhesive from the viewpoint of safety. Such adhesives may be provided by coating. As an alternative, a pressure sensitive adhesive double coated tape may be used.

However, from the viewpoint of not impairing the electrophotographic characteristic required for the recording medium when used in an electrophotographic image forming apparatus, the surface electroresistivity is in the range of $1\times10^9$ Ω/sq to $2\times10^{11}$ Ω/sq, and the volume electroresistivity is in the range of $1\times10^{10}$ Ωcm to $2\times10^{12}$ Ωcm, as specified for the recording medium of the second exemplary embodiment. Further, the average value $R_{AVE}$ of the surface electroresistivity for the entire region of the recording medium surface, and the surface electroresistivity R1 of the surface of the region of the recording medium that contains the magnetic material may meet the expression: $|\mathrm{Log}(R1)-\mathrm{Log}(R_{AVE})|\leq 1$ The basis weight (JIS P8124 (, which is incorporated herein by reference)) of the recording medium of the second exemplary embodiment is not particularly specified, and may be 60 $g/m^2$ or more. If the basis weight is less than 60 $g/m^2$, the stiffness of the recording medium is decreased; as a result, when used in an electrophotographic image forming apparatus, there occurs problems in that the recording medium winds around the fixing apparatus in the fixing process in which the transferred toner image on the recording medium is fixed, and in that image defects easily occurs due to failure to separate from the fixing apparatus. Likewise, when the basis weight is less than 60 g/$m^2$, there are problems upon application to an electrophotographic or ink jet image forming apparatus, in that the magnetic material contained in the recording medium is easily exposed on the recording medium surface, in that the magnetic material drops off the recording medium, and in that the visibility of the printed image is worsened due to the presense of visible magnetic material on the recording medium surface.

In the second exemplary embodiment, when the recording medium for use is finished, the conditioning moisture content in a controlled temperature and humidity of 23° C. and 50% RH is preferably from 5.5% to 7.5%, more preferably from 5.8% to 7.2%, and particularly preferably from 6.0% to 7.0%.

The conditioning moisture content of the recording medium greatly affects the electroresistivity. When the conditioning moisture content of the recording medium is too low, the surface electroresistivity and the volume electroresistivity of the recording medium are increased. On the other hand, when the conditioning moisture content of the recording medium is too high, the surface electroresistivity and the volume electroresistivity of the recording medium are decreased. Therefore, there is a problem in that white spots occur in an image formed on the surface of the region of the recording medium that contains the magnetic material if the conditioning moisture content is out of the range of 5.5% to 7.5%.

The conditioning moisture content can be adjusted within the range of 5.5% to 7.5% by controlling the addition of synthetic fibers, the type of pulp, the degree of beating, or the type and quantity of filler, by causing a reaction of hydroxyl groups of cellulose so as to lower the hydrophilicity of the cellulose, by coating a moisture absorption inhibitor (which will be described later) on the base paper surface, or by internally adding the moisture absorption inhibitor into the base paper. The pulp may be a chemical pulp. The beating degree of the pulp can be low. The filler may have a small specific surface area, and the conditioning moisture content can be decreased by increasing the quantity of the filler. The conditioning moisture content mentioned herein refers to the moisture content measured in conformity with JIS P8127 (Paper and board—Determination of moisture content—Oven-drying method, which is incorporated herein by reference) after leaving a naked sheet of paper for at least 15 hrs in an environment of 23° C. and 65% RH.

Thus, by adjusting the conditioning moisture content of the recording medium of the second exemplary embodiment in a controlled temperature and humidity of 23° C. and 50% RH within 5.5% to 7.5%, the volume electroresistivity and the surface electroresistivity of the recording medium of the second exemplary embodiment can be adjusted within the respective ranges specified in the exemplary embodiment of the invention.

In the second exemplary embodiment, when the recording medium for use is finished, it is possible to adjust the moisture content with a paper machine or the like during preparation of the paper substrate, such that the product moisture content immediately after a moisture proof packaging containing the recording medium is opened is in an adequate range, specifically, approximately from 3 to 6.5% by mass, more preferably approximately from 4.5 to 5.5% by mass. In order to prevent moisture absorption or desorption of the manufactured recording medium during storage, it is possible to pack a predetermined number of sheets of the recording medium, using a moisture proof packaging paper such as a polyethylene laminated paper, or a material such as polypropylene.

EXAMPLES

Hereinafter, the present invention will be described more specifically with reference to examples. However, the examples should not be construed as limiting the scope of the present invention.

Example 1

A pulp slurry containing a mixture of 90 parts by mass of LBKP (hardwood bleached kraft pulp), 10 parts by mass of NBKP (softwood bleached kraft pulp), and 5 parts by mass of a magnetic fiber (with a composition of Fe—Si—B) as a magnetic material having a diameter of 35 μm and a length of 30 mm is prepared. 2.5 parts by mass of a precipitated calcium carbonate (TAMA PEARL TP-121, manufactured by OKUTAMA KOGYO CO., LTD.) as a filler, 0.15 parts by mass of a cationized starch (trade name: MS4600, manufactured by NIHON SHOKUHIN KAKO CO., LTD.), and 0.05 parts by mass of alkenyl anhydrous succinic acid (FIVERUN 81, manufactured by Nihon NSC CO., LTD.) are added to the slurry. The amounts of the chemicals represent the amounts added to 100 parts by mass of the solid content of the pulp.

The resultant mixture is diluted with white water to form a paper stock slurry, and a paper substrate containing the magnetic material is prepared therefrom.

For papermaking, a Fourdrinier type paper machine is used.

Next, to the paper substrate prepared as described above, a coating solution containing an oxidized starch (ACE A, manufactured by Oji Cornstarch Co., Ltd.), a polyvinyl alcohol having a degree of saponification of 99 mol % (PVA-117, manufactured by KURARAY CO., LTD.), and sodium sulfate is applied with a size press apparatus so as to give a coating amount of 1 g/$m^2$, and is dried. As a result, the dry coating weights of the oxidized starch, the polyvinyl alcohol, and sodium sulfate per one side of the paper substrate are 0.7 g/$m^2$, 0.1 g/$m^2$, and 0.1 g/$m^2$, respectively.

Further, a smoothing treatment is conducted with a calender apparatus to give an Oken method smoothness of 60 sec, whereby a recording medium with a basis weight of 80 g/$m^2$ is obtained.

The Taber abrasion amount of the recording medium obtained is measured, and is found to be 5 mg. The internal bond strength is found to be 0.2 N·m.

In the measurement of the Taber abrasion amount, the recording medium of the first exemplary embodiment whose moisture content has been controlled in conformity with JIS P8111 is used for the measurement with a Taber rotary abrasion tester manufactured by Toyo Seiki Seisaku-Sho Ltd. using an abrasive wheel CS-10 having an outer diameter of 50 mm at an abrasion turning speed of 60 rpm under a test load of 2.45 N (250 gf) for a number of abrasion turns of 50 turns in a test environment of 23° C. and 50% RH.

In addition, the measured internal bond strength is the internal bond strength defined in JAPAN TAPPI No. 18-2.

In addition, the basis weight is determined in accordance with the method described in JIS P8124, which is incorporated herein by reference. The measurement of the basis weight is conducted in the same manner also in the following Examples and Comparative Examples.

Example 2

A first paper substrate layer is formed by papermaking with a cylinder paper machine from a paper stock slurry prepared by removing the magnetic fiber and the precipitated calcium carbonate as the filler from the paper stock slurry used in Example 1, such that the basis weight is 30 $g/m^2$. On this first paper substrate layer, a second paper substrate layer as an intermediate layer is formed by carrying out papermaking such that the basis weight is 30 $g/m^2$, using the same paper stock slurry as that used in Example 1, except that the composition of the magnetic material in the paper stock slurry is changed to Fe—Co—Si, and the precipitated calcium carbonate is removed. Further, on this second paper substrate layer, the third paper substrate layer is formed by papermaking to give a basis weight of 30 $g/m^2$ in the same manner as the formation of the first paper substrate layer.

Further, after carrying out size press coating treatment in the same manner as in Example 1, the same coating solution as that used in Example 1 is applied in the same manner as in Example 1, and the calender process is conducted in the same manner as in Example 1 to form a surface layer. As a result, a recording medium is obtained which has a basis weight of 90 $g/m^2$, consists of the three layers, and contains the magnetic material in the middle layer.

The Taber abrasion amount and the internal bond strength of the recording medium obtained are measured in the same manner as in Example 1, and the Taber abrasion amount is found to be 4 mg, and the internal bond strength is found to be 0.3 N·m.

Example 3

A paper stock slurry is prepared which is the same as the paper stock slurry used in Example 1 except that the magnetic material is not contained and the filler is changed to 11 parts by mass of a precipitated calcium carbonate (TAMA PEARL TP-121, manufactured by OKUTAMA KOGYO CO., LTD.). A first paper substrate layer having a basis weight of 40 $g/m^2$ is prepared by paper making with a cylinder paper machine using the paper stock slurry. Next, on this first paper substrate layer, a second paper substrate layer having a basis weight is 40 $g/m^2$ is formed by carrying out papermaking with the cylinder paper machine, using a paper stock slurry that is the same as that used in Example 1 except that the composition of the magnetic material in the paper stock slurry is changed to Fe—Co—Si, and the amount of the precipitated calcium carbonate to be added is changed to 11 parts by mass.

Further, after the size press coating treatment in the same manner as in Example 1, the same coating solution as that used in Example 1 is applied in the same manner as in Example 1, and the calender process is conducted in the same manner as in Example 1, so that a surface layer is formed. In this way, a recording medium with a basis weight of 80 $g/m^2$ including two layers one of which contains the magnetic material, is obtained.

The Taber abrasion amount and the internal bond strength of the recording medium obtained are measured in the same manner as in Example 1, and the Taber abrasion amount is found to be 10 mg, and the internal bond strength is found to be 0.11 N·m.

Example 4

A paper stock slurry is prepared which is the same as the paper stock slurry used in Example 1 except that the precipitated calcium carbonate (TAMA PEARL TP-121, manufactured by OKUTAMA KOGYO CO., LTD.) as the filler is removed therefrom, the composition of the magnetic fiber is changed to Fe—Co—Si, and 0.4 parts by mass of a polyacrylamide-based resin (trade name: PS3874-20, manufactured by Arakawa Chemical, Inc.) is added as a paper strength additive. After carrying out papermaking from the paper stock slurry with the paper machine used in Example 1, a size press coating treatment is conducted in the same manner as in Example 1. Then, the same coating solution as that used in Example 1 is applied in the same manner as in Example 1, and the calender process is conducted in the same manner as in Example 1, so that a surface layer is formed. In this way, a recording medium with a basis weight of 80 $g/m^2$ is obtained.

The Taber abrasion amount and the internal bond strength of the recording medium obtained are measured in the same manner as in Example 1, and the Taber abrasion amount is found to be 3 mg, and the internal bond strength is found to be 0.35 N·m.

Example 5

A paper stock slurry is prepared which is the same as the paper stock slurry used in Example 1 except that the amount of the precipitated calcium carbonate (TAMA PEARL TP-121, manufactured by OKUTAMA KOGYO CO., LTD.) as the filler is changed to 8 parts by mass, and the composition of the magnetic fiber is changed to Fe—Co—Si. After carrying out papermaking from the paper stock slurry with the paper machine used in Example 1, a size press coating treatment is conducted in the same manner as in Example 1. Then, the same coating solution as that used in Example 1 is applied in the same manner as in Example 1, and the calender process is conducted in the same manner as in Example 1, so that a surface layer is formed. In this way, a recording medium with a basis weight of 80 $g/m^2$ is obtained.

The Taber abrasion amount and the internal bond strength of the recording medium obtained are measured in the same manner as in Example 1, and the Taber abrasion amount is found to be 7 mg, and the internal bond strength is found to be 0.15 N·m.

Comparative Example 1

A paper stock slurry is prepared which is the same as the paper stock slurry used in Example 1 except that the amount of the precipitated calcium carbonate (TAMA PEARL TP-121, manufactured by OKUTAMA KOGYO CO., LTD.) as the filler is changed to 17 parts by mass, and the magnetic fiber is changed to 5 parts by mass of an ordinary metal fiber that does not exhibit a large Barkhausen effect (a stainless steel fiber NASLON manufactured by Nippon Seisen Co., Ltd.). After carrying out papermaking from the paper stock slurry with the paper machine used in Example 1, a size press coating treatment is conducted in the same manner as in Example 1. Then, a coating solution is applied in the same manner as in Example 1. The coating solution is the same as that used in Example 1, except that the polyvinyl alcohol having a degree of saponification of 99 mol % (PVA-117, manufactured by KURARAY CO., LTD.) is not contained. Then, the calender process is conducted in the same manner as in Example 1, so that a surface layer is formed. In this way, a recording medium with a basis weight of 80 $g/m^2$ is obtained.

The Taber abrasion amount and the internal bond strength of the recording medium obtained are measured in the same manner as in Example 1, and the Taber abrasion amount is found to be 18 mg, and the internal bond strength is found to be 0.08 N·m.

Comparative Example 2

A paper stock slurry is prepared which is the same as the paper stock slurry used in Example 1 except that the composition of the magnetic fiber is changed to Nd—Fe—B. After carrying out papermaking from the paper stock slurry with the paper machine used in Example 1, a size press coating treatment is conducted in the same manner as in Example 1. Then, a coating solution is applied in the same manner as in Example 1. The coating solution is the same as that used in Example 1, except that the polyvinyl alcohol having a degree of saponification of 99 mol % (PVA-117, manufactured by KURARAY CO., LTD.) is not contained. Then, the calender process is conducted in the same manner as in Example 1, so that a surface layer is formed. In this way, a recording medium with a basis weight of 80 g/$m^2$ is obtained.

The Taber abrasion amount and the internal bond strength of the recording medium obtained are measured in the same manner as in Example 1, and the Taber abrasion amount is found to be 15 mg, and the internal bond strength is found to be 0.12 N·m.

Comparative Example 3

A paper stock slurry is prepared which is the same as the paper stock slurry used in Example 1 except that the amount of the precipitated calcium carbonate (TAMA PEARL TP-121, manufactured by OKUTAMA KOGYO CO., LTD.) as the filler is changed to 22 parts by mass. After carrying out papermaking from the paper stock slurry with the paper machine used in Example 1, a size press coating treatment is conducted in the same manner as in Example 1. Then, the same coating solution as that used in Example 1 is applied in the same manner as in Example 1, and the calender process is conducted in the same manner as in Example 1, so that a surface layer is formed. In this way, a recording medium with a basis weight of 80 g/$m^2$ is obtained.

The Taber abrasion amount and the internal bond strength of the recording medium obtained are measured in the same manner as in Example 1, and the Taber abrasion amount is found to be 20 mg, and the internal bond strength is found to be 0.07 N·m.

Table 1 shows the characteristics of each of the recording media manufactured in Example 1 to Example 5 and Comparative Example 1 to Comparative Example 3.

(Quality Evaluation Method)

Image formation is conducted on each of the recording media manufactured in the Example 1 to Example 5 and the Comparative Example 1 to Comparative Example 3 using the following image forming apparatus, and the drop off grade of the magnetic fiber grade is evaluated. The evaluation results are shown in Table 2.

The respective evaluation methods are as described below.

A half-tone image (hereinafter referred to as an entire surface half-tone image) is continuously printed on the entire surface of 2,000 sheets of each of the recording media manufactured in the Example 1 to Example 5 and the Comparative Example 1 to Comparative Example 3, by using a DocuCentreColor f450 (manufactured by Fuji Xerox Co., Ltd.) in the plain paper mode as the fixing conditions. The following evaluations are conducted on the sheets.

[Magnetic Fiber Drop Off Grade Evaluation Method]

When the printing is continuously conducted on the 2,000 sheets with the DocuCentreColor f450 (manufactured by Fuji Xerox Co., Ltd.), the amount of magnetic fiber deposited and accumulated on the paper feed roll, the transfer belt cleaner, and the fixing roll is visually determined. In addition, the image defects of the entire surface half-tone image, such as streaks and white spots, are visually determined. Further, running defects at the time of paper feed such as misfeeding are taken into consideration for reference.

The evaluation criterion is as follows:

A: Drop off of magnetic fiber is not observable at all, and there is no image defect or running defect.

B: Drop off of magnetic fiber is hardly observable, and there is no image defect or running defect.

C: Slight drop off of magnetic fiber is observable, and there is a slight image defect, but there is no running defect.

D: Drop off of magnetic fiber is observable, and there are image defects and/or running defects, which greatly deteriorates the performance of the electrophotographic apparatus.

TABLE 1

| | Magnetic fiber | Presence of Absence of Large Barkhausen effect | Filler (% by mass) | Layer structure of paper substrate | Amount of Taber abrasion (mg) | Internal bond strength (N · m) |
|---|---|---|---|---|---|---|
| Example 1 | Fe—Si—B | exhibited | Calcium carbonate 2% | Single layer | 5 | 0.2 |
| Example 2 | Fe—Co—Si | exhibited | Calcium carbonate 0% | Triple layer | 4 | 0.3 |
| Example 3 | Fe—Co—Si | exhibited | Calcium carbonate 10% | Double layer | 10 | 0.11 |
| Example 4 | Fe—Co—Si | exhibited | Calcium carbonate 0% | Single layer | 3 | 0.35 |
| Example 5 | Fe—Co—Si | exhibited | Calcium carbonate 7% | Single layer | 7 | 0.15 |
| Comparative Example 1 | Stainless steel fiber | not exhibited | Calcium carbonate 15% | Single layer | 18 | 0.08 |
| Comparative Example 2 | Nd—Fe—B | not exhibited | Calcium carbonate 12% | Single layer | 15 | 0.12 |
| Comparative Example 3 | Fe—Co—Si | exhibited | Calcium carbonate 20% | Single layer | 20 | 0.07 |

TABLE 2

| | EX. 1 | EX. 2 | EX. 3 | EX. 4 | EX. 5 | COMP. EX. 1 | COMP. EX. 2 | COMP. EX. 3 |
|---|---|---|---|---|---|---|---|---|
| Magnetic fiber drop off grade | A | B | C | A | B | D | D | D |

Example 6

A pulp slurry is prepared by mixing 90 parts by mass of LBKP (with a freeness (CSF) of 400 ml), 10 parts by mass of NBKP (with a freeness (CSF) of 450 ml), and 15 parts by mass of a magnetic material (having a composition of Fe—Si—B, a length of 8 mm, and a diameter of 12 μm). 0.7 parts by mass of a polyacrylamide-based resin (trade name: PS3874-20, manufactured by Arakawa Chemical, Inc.) is added thereto as a paper strength additive. The resultant mixture is diluted with white water to give a paper stock slurry with a pH value of 5.8, and a solid content concentration of 0.4%.

This paper stock slurry is used for papermaking with an oriented sheet former (trade name: ORIENTED SHEET FORMER manufactured by Kumagai Riki Kogyo Co., Ltd.). The sheet obtained is pressed with a square sheet machine press (manufactured by Kumagai Riki Kogyo Co., Ltd.) for 10 min at a pressure of 5 kgf/cm$^2$; and dried with a rotary drier (trade name: ROTARY DRYER DR-200, manufactured by Kumagai Riki Kogyo Co., Ltd.) under conditions of a drum temperature of 80° C. and a rotational speed of 120 cm/min, so that a recording medium according to the second exemplary embodiment is obtained.

Further, to this recording medium, an aqueous solution of sodium sulfate (with a concentration of 1.4%) is applied as a conductivity-imparting agent by using a bar, to give a coating amount of 0.6 g/m$^2$ (in terms of dry mass). In this way, a recording medium of the second exemplary embodiment is obtained.

The characteristics of the recording medium obtained are shown in Table 3.

Example 7

A recording medium is obtained in the same manner as that in Example 6, except that the magnetic material contained in the paper stock slurry used in Example 6 is changed to a magnetic material having a composition of Fe—Co—Si, a length of 80 mm, and a diameter of 75 μm, the concentration of the sodium sulfate aqueous solution to be applied to the recording medium surface is changed to 3.1%, and the coating amount is changed to 1.2 g/m$^2$ in terms of dry mass. The characteristics of the recording medium obtained are shown in Table 3.

Example 8

A recording medium is obtained in the same manner as that in Example 7, except that the concentration of the sodium sulfate aqueous solution is changed to 6.2%; and the amount of coating is changed to a dry mass of 2.3 g/m$^2$. The characteristics of the recording medium obtained are shown in Table 3.

Example 9

A recording medium is obtained in the same manner as that in Example 7, except that the concentration of the sodium sulfate aqueous solution is changed into 0.6%; and the amount of coating with a bar is changed to a dry mass of 0.4 g/m$^2$. The characteristics of the recording medium obtained are shown in Table 3.

Example 10

A paper stock slurry free of magnetic material is prepared which is a mixture of 90 parts by mass of LBKP (with a freeness (CSF) of 400 ml) and 10 parts by mass of NBKP (with a freeness (CSF) of 400 ml). 0.6 parts by mass of a polyacrylamide-based resin (trade name: PS3874-20, manufactured by Arakawa Chemical, Inc.) is added thereto as a paper strength additive. A pulp layer as a paper substrate is formed therefrom by using an oriented sheet former (trade name: ORIENTED SHEET FORMER manufactured by Kumagai Riki Kogyo Co., Ltd.).

Next, another layer is provided on the surface of the pulp layer by papermaking with an oriented sheet former (trade name: ORIENTED SHEET FORMER manufactured by Kumagai Riki Kogyo Co., Ltd.) using the following paper stock slurry. As a result, a recording medium having two layers (a dual-layer paper substrate) is obtained.

Further, to the recording medium, an aqueous solution of sodium sulfate (with a concentration of 3.1%) is applied, using a bar, such that the amount of coating is 1.2 g/m$^2$ (in terms of dry mass). In this way, a recording medium of the second exemplary embodiment is obtained.

The characteristics of the recording medium obtained are shown in Table 3.

[Paper Stock Slurry]

| | |
|---|---|
| LBKP (with a freeness (CSF) of 400 ml): | 90 parts by mass |
| NBKP (with a freeness (CSF) of 400 ml): | 10 parts by mass |
| Magnetic material (composition: Fe—Co—Si, length: 40 mm, diameter: 40 μm): | 12 parts by mass |
| Paper strength additive (trade name: PS3874-20, manufactured by Arakawa Chemical, Inc.): | 0.8 parts by mass |

Example 11

Commercially available plain paper (OK PRINCE wood free paper with a basis weight of 64 g/m$^2$, manufactured by Oji Paper Company, Ltd.) is coated with an aqueous solution of sodium sulfate (with a concentration of 3.1%) with a bar, to give a coating amount of 1.0 g/m$^2$ (in terms of dry mass). A surface of the plain paper coated with the conductivity-imparting agent is further coated with a polyethylene adhesive (NARUTACK manufactured by NARUSE KAGAKU Co., LTD.) in a coating amount of 20 g/m$^2$. Pieces of a magnetic material (composition: Fe—Co—Si, length: 420 mm, diameter: 45 μm) are adhered onto the coated surface such that the pieces are arranged in parallel to the longitudinal direction of the recording medium with a spacing of 50 mm between the neighbouring pieces. Then, another plain paper sheet coated with the conductivity-imparting agent obtained in the same manner as described above is adhered thereon such that this magnetic material is laminated between the plain paper sheets. A recording medium of the second exemplary embodiment is obtained in this way. The characteristics of the recording medium obtained are shown in Table 3.

Comparative Example 4

A pulp slurry is provided which is a mixture of 90 parts by mass of LBKP (with a freeness (CSF) of 500 ml), 10 parts by mass of NBKP (with a freeness (CSF) of 300 ml), and 10 parts by mass of a magnetic material (a metal fiber, specifically, a stainless steel fiber, NASLON, manufactured by Nippon Seisen Co., Ltd., with a length of 10 mm, and a diameter of 20 μm). 0.6 parts by mass of a polyacrylamide based-resin (trade name: PS3874-20, manufactured by Arakawa Chemical, Inc.) is added thereto as a paper strength additive, and the resultant mixture is diluted with white water to prepare a paper stock slurry with a pH value of 6.2 and a solid content concentration of 0.4%.

This paper stock slurry is used for papermaking with an oriented sheet former (trade name: ORIENTED SHEET FORMER manufactured by Kumagai Riki Kogyo Co., Ltd.), so that a recording medium is obtained. The characteristics of the recording medium obtained are shown in Table 3.

Comparative Example 5

A pulp slurry is prepared which is a mixture of 95 parts by mass of LBKP (with a freeness of 400 mls CSF), 5 parts by mass of NBKP (with a freeness of 400 mls CSF), and 25 parts by mass of a magnetic material (with a composition of Fe—Si—B, a length of 3 mm, and a diameter of 8 μm). 0.6 parts by mass of a polyacrylamide based-resin (trade name: PS3874-20, manufactured by Arakawa Chemical, Inc.) is added thereto as a paper strength additive, and the resultant mixture is diluted with white water to prepare a paper stock slurry with a pH value of 6.2 and a solid content concentration of 0.4%.

This paper stock slurry is used for papermaking with an oriented sheet former (trade name: ORIENTED SHEET FORMER manufactured by Kumagai Riki Kogyo Co., Ltd.), so that a recording medium is obtained.

After drying, the surface of the recording medium obtained is coated with an aqueous solution of sodium chloride (with a concentration of 0.2%) with a bar such that the amount of coating is 0.1 g/m$^2$ in terms of dry mass, so that a recording medium is obtained. The characteristics of the recording medium obtained are shown in Table 3.

Comparative Example 6

A pulp slurry is prepared which is a mixture of 92 parts by mass of LBKP (with a freeness (CSF) of 500 ml), 8 parts by mass of NBKP (with a freeness (CSF) of 400 ml), and 8 parts by mass of a magnetic material (with a composition of Fe—Si—B, a length of 45 mm, and a diameter of 60 μm). 0.4 parts by mass of a polyacrylamide based-resin (trade name: PS3874-20, manufactured by Arakawa Chemical, Inc.) is added thereto as a paper strength additive, and the resultant mixture is diluted with white water to give a paper stock slurry with a pH value of 5.8 and a solid content concentration of 0.4%.

This paper stock slurry is used for papermaking with an oriented sheet former (trade name: ORIENTED SHEET FORMER manufactured by Kumagai Riki Kogyo Co., Ltd.), and the surface of the recording medium obtained is coated with an aqueous solution of sodium chloride (with a concentration of 8.4%) by using a bar such that the amount of coating is 4.6 g/m$^2$ in terms of dry mass, so that a recording medium is obtained. The characteristics of the recording medium obtained are shown in Table 3.

Comparative Example 7

A paper stock slurry free of magnetic material is prepared which is a mixture of 85 parts by mass of LBKP (with a freeness (CSF) of 400 ml) and 15 parts by mass of NBKP (with a freeness (CSF) of 400 ml). 0.4 parts by mass of a polyacrylamide-based resin (trade name: PS3874-20, manufactured by Arakawa Chemical, Inc.) is added thereto as a paper strength additive, and a pulp layer as a paper substrate is formed therefrom by using an oriented sheet former (trade name: ORIENTED SHEET FORMER manufactured by Kumagai Riki Kogyo Co., Ltd.).

Then, another layer is formed on the surface of this pulp layer by papermaking with an oriented sheet former (trade name: ORIENTED SHEET FORMER manufactured by Kumagai Riki Kogyo Co., Ltd.) using the following paper stock slurry. In this way, a recording medium is obtained which has a paper substrate of two layers (dual-layer papermaking).

Further, an aqueous solution of sodium sulfate (with a concentration of 7.6%) is applied with a bar onto the recording medium such that the amount of coating is 4.1 g/m$^2$ in terms of dry mass. As a result, a recording medium according to the second exemplary embodiment of the present invention is obtained. The characteristics of the recording medium obtained are shown in Table 3.

[Paper Stock Slurry]

LBKP (with a freeness (CSF) of 400 ml): 90 parts by mass

NBKP (with a freeness (CSF) of 300 ml): 10 parts by mass

Magnetic material (with a composition of Fe—Co—Si): 12 parts by mass

Paper strength additive (trade name: PS3874-20, manufactured by Arakawa Chemical, Inc.): 0.5 parts by mass (Characteristics Evaluation)

Measurements are conducted on each of the recording media which are manufactured in the Example 6 to Example 11 and Comparative Example 4 to Comparative Example 7, according to the following measurement methods, so that the surface electroresistivity R1 in an environment of 23° C. and 50% RH of the surface of the region of the recording medium that contains the magnetic material, the average value $R_{AVE}$ of the surface electroresistivity in an environment of 23° C. and 50% RH over the entire surface region of the recording medium, the average value of the volume electroresistivity in an environment of 23° C. and 50% RH over the entire surface region of the recording medium, the basis weight, the thickness, and the equilibrium moisture content are determined.

The basis weight is determined by the method defined in JIS P8124 (, which is incorporated herein by reference), and the thickness of the recording medium is determined by the method defined in JIS P8118 (, which is incorporated herein by reference).

[Method for Measuring (Average of) Volume Electroresistivity]

The volume electroresistivity of the recording medium is determined by measuring the volume electroresistivity over the entire region of the recording medium in an environment of 23° C. and 50% RH in conformity with JIS K6911 (, which is incorporated herein by reference), and calculating the average value from the measurement results. Before the measurement, the temperature and moisture content of the recording medium is controlled by leaving the recording medium in an environment of 23° C. and 50% RH for at least 12 hrs. For the measurement, a commercially available resistivity meter and resistance measurement chamber (trade name: R8340 and R12704, manufactured by Advantest Corp.) is used. The measurement is conducted by moving the position of contact between the resistance measurement chamber and the surface of the recording medium under the conditions of an application voltage of 100 V and an electrode diameter of 50 mm ϕ, so as to change the volume electroresistivity measurement place.

[Method for Measuring Average Value of Surface Electroresistivity]

The surface electroresistivity of the recording medium is determined by measuring the surface electroresistivity over the entire region of the recording medium in an environment of 23° C. and 50% RH in conformity with JIS K6911 (, which is incorporated herein by reference), and calculating the average value from the measurement results. Before the measurement, the temperature and moisture content of the recording medium is controlled by leaving the recording medium in an environment of 23° C. and 50% RH for at least 12 hrs. For the measurement, a commercially available resistivity meter and resistance measurement chamber (trade name: R8340 and R12704, manufactured by Advantest Corp.) is used. The measurement is conducted by moving the position of contact between the resistance measurement chamber and the surface of the recording medium under the conditions of an application voltage of 100 V and an electrode diameter of 50 mm ϕ, so as to change the surface electroresistivity measurement place.

The surface electroresistivity of the surface of the region of the recording medium that contains the magnetic material is determined by measuring the surface electroresistivity in an environment of 23° C. and 50% RH in conformity with JIS K6911. Before the measurement, the temperature and moisture content of the recording medium is controlled by leaving the recording medium in an environment of 23° C. and 50% RH for at least 12 hrs. For the measurement, a commercially available resistivity meter and resistance measurement head (trade name: R8340, manufactured by Advantest Corp.) is used. The measurement is conducted with the resistance measurement head contacting the surface of the region containing the magnetic material under the conditions of an application voltage of 100 V and an electrode diameter of 16 mm ϕ.

[Method for Measuring Conditioning Moisture Content]

The conditioning moisture content of the recording medium obtained is determined by leaving the naked recording medium for at least 15 hrs in an environment of 23° C. and 65% RH in conformity with JIS P8127 (Paper and board—Determination of moisture content—Oven-drying method), which is incorporated herein by reference.

The manufacturing conditions for the respective recording media manufactured in Example 6 to Example 11 and Comparative Example 4 to Comparative Example 7 are shown in Table 3.

TABLE 3

| | Surface electro-resistivity (Ω/sq) | Volume electro-resistivity (Ωcm) | Conditioning moisture content (%) | $\lvert\log(R1 - R_{AVE})\rvert$ | Magnetic material (Presence or absence of Large Barkhausen effect) | Conductivity-imparting treatment method | Single layer/ Multi-layer/ Lamination | Basis weight (g/m$^2$) | Paper thickness (μm) |
|---|---|---|---|---|---|---|---|---|---|
| Example 6 | $1.0 \times 10^{11}$ | $1.9 \times 10^{12}$ | 6.2 | 0.8 | Fe—Si—B (present) | Sodium sulfate surface coating | Single layer | 108 | 116 |
| Example 7 | $2.8 \times 10^{10}$ | $1.3 \times 10^{11}$ | 7.3 | 0.4 | Fe—Co—Si (present) | Sodium sulfate surface coating | Single layer | 291 | 296 |
| Example 8 | $6.4 \times 10^{9}$ | $4.0 \times 10^{10}$ | 7.0 | 0.6 | Fe—Co—Si (present) | Sodium sulfate surface coating | Single layer | 206 | 215 |
| Example 9 | $2.4 \times 10^{9}$ | $1.6 \times 10^{10}$ | 5.8 | 1.2 | Fe—Co—Si (present) | Sodium sulfate surface coating | Single layer | 52 | 58 |
| Example 10 | $2.2 \times 10^{10}$ | $9.7 \times 10^{10}$ | 6.1 | 0.2 | Fe—Co—Si (present) | Sodium sulfate surface coating | Multi-layer | 86 | 99 |
| Example 11 | $9.4 \times 10^{10}$ | $7.9 \times 10^{11}$ | 6.2 | 0.3 | Fe—Co—Si (present) | Sodium sulfate surface coating | Lamination | 150 | 180 |
| Comparative Example 4 | $9.0 \times 10^{11}$ | $8.2 \times 10^{12}$ | 6.2 | 1.7 | Stainless steel fiber (absent) | Not Applied | Single layer | 105 | 106 |
| Comparative Example 5 | $8.4 \times 10^{11}$ | $8.6 \times 10^{12}$ | 6.1 | 1.3 | Fe—Co—Si (present) | Sodium chloride surface coating | Single layer | 89 | 102 |
| Comparative Example 6 | $8.4 \times 10^{8}$ | $7.2 \times 10^{9}$ | 6.8 | 1.4 | Fe—Co—Si (present) | Sodium chloride surface coating | Single layer | 224 | 232 |
| Comparative Example 7 | $7.6 \times 10^{8}$ | $7.5 \times 10^{9}$ | 5.9 | 1.5 | Fe—Co—Si (present) | Sodium sulfate surface coating | Multi-layer | 102 | 110 |

(Quality Evaluation Method)

Image formation is conducted on each of the recording media manufactured in Example 6 to Example 11 and Comparative Example 4 to Comparative Example 7 using the following image forming apparatus, so as to evaluate the grade of transfer white spots. The results of the evaluation are shown in Table 4.

[Grade Evaluation Method for Transfer White Spot]

A black solid image with a concentration of 300% is formed on each of the recording media manufactured in Example 6 to Example 11 and Comparative Example 4 to Comparative Example 7 under the image formation conditions described above. The image formation results are evaluated visually.

The evaluation criterion is as follows:

G0: There is no white spot on the surface of the region containing the magnetic material.

G1 to G2: White spots are generated on the surface of the region containing the magnetic material, but they do not cause problems as a product.

G3: White spots are generated on at least a part of the surface of the region containing the magnetic material, and they cause problems as a product.

G4 to G5: White spots are generated on at least 15% of the surface of the region containing the magnetic material, and they are at a level that makes the recording medium unusable as a product.

TABLE 4

| | EX. 6 | EX. 7 | EX. 8 | EX. 9 | EX. 10 | EX. 11 | COMP. EX. 4 | COMP. EX. 5 | COMP. EX. 6 | COMP. EX. 7 |
|---|---|---|---|---|---|---|---|---|---|---|
| Grade of transfer white spots | G1.5 | G0 | G1 | G2 | G0 | G1 | G5 | G3 | G4 | G4 |

The foregoing description of the exemplary exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention will be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A recording medium comprising a substrate, a magnetic material inside the substrate, and a surface layer on the substrate, and having wherein the Taber abrasion amount of the recording medium is about 10 mg or less;

wherein the magnetic material has a Fe—Co—Si-based amorphous magnetic material as its basic component, and the substrate comprises a fiber obtained by i) impregnating a pulp fiber with a synthetic resin, or ii) thermally fusing a synthetic resin into a pulp fiber, wherein the synthetic resin is selected from the group consisting of polyethylene, polypropylene, polystyrene, polyvinyl chloride and polyester; and the surface layer has a dry mass of about 0.8 to 3.0 g/m$^2$ containing a material selected from the group consisting of a polyvinyl alcohol having a saponification degree of about 90 mol % or more, a modified polyvinyl alcohol, a styrene-anhydrous maleic acid copolymer, a vinyl chloride-vinyl acetate copolymer, a styrene-butadiene copolymer, and a polyacrylic acid ester.

2. The recording medium of claim 1, wherein the internal bond strength of the recording medium is about 0.1 N·m or more.

3. The recording medium of claim 1, wherein the magnetic material exhibits a large Barkhausen effect.

4. The recording medium of claim 3, wherein the magnetic material is in the shape of a wire having a diameter of about 10 μm or more.

5. The recording medium of claim 4, wherein the length of the magnetic material is from about 5 mm to about 430 mm.

6. The recording medium of claim 4, wherein the diameter of the magnetic material is from about 10 μm to about 40 μm.

7. The recording medium of claim 1, wherein an amount of a filler relative to a solid content of the substrate of the recording medium is about 10% by mass or less.

8. A recording medium comprising a magnetic material, a substrate and a surface layer on the substrate, wherein the Taber abrasion amount of the recording medium is about 10 mg or less, and, in an environment of 23° C. and 50% RH, the surface electroresistivity of the recording medium is about $1\times10^9$ Ω/sq to $2\times10^{11}$ Ω/sq and the volume electroresistivity of the recording medium is about $1\times10^{10}$ Ωcm to $2\times10^{12}$ Ωcm;

wherein the magnetic material has a Fe—Co—Si-based amorphous magnetic material as its basic component, and the substrate comprises a fiber obtained by i) impregnating a pulp fiber with a synthetic resin, or ii) thermally fusing a synthetic resin into a pulp fiber, wherein the synthetic resin is selected from the group consisting of polyethylene, polypropylene, polystyrene, polyvinyl chloride and polyester; and the surface layer is a surface layer with a dry mass of about 0.8 to 3.0 g/m$^2$ containing a material selected from the group consisting of a polyvinyl alcohol having a saponification degree of about 90 mol % or more, a modified polyvinyl alcohol, a styrene-anhydrous maleic acid copolymer, a vinyl chloride-vinyl acetate copolymer, a styrene-butadiene copolymer, and a polyacrylic acid ester.

9. The recording medium of claim 8, wherein an average value $R_{AVE}$ of the surface electroresistivity over the entire surface region of a body of the recording medium, and a surface electroresistivity R1 of a surface of a region of the body of the recording medium that contains the magnetic material have a relationship expressed by the following formula (1): $|\mathrm{Log}(R1)-\mathrm{Log}(R_{AVE})|\leq 1$.

10. The recording medium of claim 8, wherein a conditioning moisture content in an environment of 23° C. and 50% RH is from about 5.5% to about 7.5%.

11. The recording medium of claim 8, wherein the magnetic material exhibits a large Barkhausen effect.

12. The recording medium of claim 11, wherein the magnetic material is in the shape of a wire having a diameter of about 10 μm or more.

13. The recording medium of claim 12, wherein the length of the magnetic material is from about 5 mm to about 430 mm.

14. The recording medium of claim 12, wherein the diameter of the magnetic material is from about 10 μm to about 60 μm.

15. The recording medium of claim 8, wherein the substrate comprises a pair of substrate sheets and the magnetic material is sandwiched between the pair of substrate sheets.

16. The recording medium of claim 8, wherein the recording medium is produced by papermaking from paper stock and the magnetic material.

* * * * *